United States Patent
Jin et al.

(10) Patent No.: US 11,916,457 B2
(45) Date of Patent: Feb. 27, 2024

(54) MOVING-MAGNET-TYPE LINEAR VIBRATION MOTOR

(71) Applicant: JinLong Machinery & Electronics Co., Ltd., ZheJiang (CN)

(72) Inventors: Shite Jin, ZheJiang (CN); Xu Nan, Zhejiang (CN)

(73) Assignee: JinLong Machinery & Electronics Co., Ltd., ZheJiang (CN)

( * ) Notice: Subject to any disclaimer, the term of this patent is extended or adjusted under 35 U.S.C. 154(b) by 828 days.

(21) Appl. No.: 16/072,478

(22) PCT Filed: Apr. 25, 2018

(86) PCT No.: PCT/CN2018/084444
§ 371 (c)(1),
(2) Date: Nov. 30, 2020

(87) PCT Pub. No.: WO2019/165694
PCT Pub. Date: Sep. 6, 2019

(65) Prior Publication Data
US 2021/0091648 A1    Mar. 25, 2021

(30) Foreign Application Priority Data
Mar. 2, 2018   (CN) .......................... 201810175193.2

(51) Int. Cl.
*H04R 25/00*    (2006.01)
*H02K 7/065*    (2006.01)
(Continued)

(52) U.S. Cl.
CPC ............. *H02K 33/18* (2013.01); *H02K 7/065* (2013.01); *H02K 33/02* (2013.01)

(58) Field of Classification Search
CPC ............................... H02K 33/18; H02K 33/02
(Continued)

(56) References Cited

U.S. PATENT DOCUMENTS
2016/0372998 A1    12/2016  Xu et al.

FOREIGN PATENT DOCUMENTS
CN   105048757 A   11/2015
CN   106100275 A   11/2016
(Continued)

OTHER PUBLICATIONS

Daqaq, Mohammed F . . . (2019). Dynamics of Particles and Rigid Bodies—A Self-Learning Approach—8.2.1 Electromagnetic Force. pp. 227-284. John Wiley & Sons. Retrieved from https://app.knovel.com/hotlink/pdf/id:kt0137R8A2/dynamics-particles-rigid/electromagnetic-force (Year: 2019).*

(Continued)

*Primary Examiner* — Phylesha Dabney
(74) *Attorney, Agent, or Firm* — Taft Stettinius & Hollister LLP; Stephen F. Rost

(57) ABSTRACT

The present disclosure provides a moving-magnet-type linear vibration motor that comprises a housing, having an accommodation space; two elastic members, oppositely connected on side walls of the housing; a mass block, hung inside the accommodation space of the housing through circumferential wall respectively connected with the two elastic members; two magnets, respectively fixedly connected with two sides of the mass block, and forming an acute angle or an obtuse angle with respect to a connection line between the centers of the two elastic members; two coils, fixed on the housing and respectively spaced apart from a corresponding one of the magnets, and forming an acute angle or an obtuse angle with respect to the connection line between the centers of the two elastic members.

18 Claims, 3 Drawing Sheets

(51) Int. Cl.
*H02K 33/02* (2006.01)
*H02K 33/18* (2006.01)

(58) Field of Classification Search
USPC .......................................................... 381/396
See application file for complete search history.

(56) References Cited

FOREIGN PATENT DOCUMENTS

| CN | 106300869 A |   | 1/2017 |
|----|-------------|---|--------|
| CN | 106411092 A |   | 2/2017 |
| CN | 107565791 A | * | 1/2018 |
| CN | 107565791 A |   | 1/2018 |

OTHER PUBLICATIONS

Parth G. (May 25, 2021). The Equation Explains Electricity (and Other Electromagnetic Phenomena). Retrieved from https://www.youtube.com/watch?v=gSI3PuHQO9A (Year: 2021).*
National MagLab. (Apr. 24, 2017). The Lorentz Force Retrieved from https://www.youtube.com/watch?v=nRDVm5mn_2A (Year: 2017).*
CN 107565791 A . English Translation. (Year: 2018).*
International Search Report (with English translation of International Search Report0 and Written Opinion, dated Nov. 1, 2018, in corresponding International Application No. PCT/CN2018/084444, 9 pages.

* cited by examiner

MOVING-MAGNET-TYPE LINEAR VIBRATION MOTOR

CROSS REFERENCE TO RELATED APPLICATIONS

This application is a continuation of International Application No. PCT/CN2018/084444, filed on Apr. 25, 2018, which is based upon and claims priority to Chinese Patent Application No. 201810175193.2, filed on Mar. 2, 2018, titled "Moving-Magnet-Type Linear Vibration Motor", and the entire contents of which are incorporated herein by reference.

TECHNICAL FIELD

The present disclosure relates to the technical field of vibration motors, and in particular relates to a moving-magnet-type linear vibration motor.

BACKGROUD

In recent years, micro-type horizontal linear vibration motors start to be used in the fields such as wearable devices and cellphones, and get good feedbacks from customers. This type of motor has advantages such as clear and strong vibration feel, fast response to multiple signals, realistic tactile feedback of scenes. Since these good experiences become widely recognized, not only manufacturers of cellphones and wearable devices utilize linear motors, but also manufacturers of vehicle onboard touch screen and portable handheld game console show keen interest.

Linear vibration motors in prior art generally comprises a housing, a stator assembly and a vibrator assembly, wherein linear vibration is realized by reciprocating movement of the vibrator assembly. However, the linear vibration motors in prior art customarily has a vibrator assembly that vibrates in a single direction, which cannot meet the requirements for multi-directional vibration.

SUMMARY

Therefore, one object of present disclosure is to provide a moving-magnet-type linear vibration motor, which can vibrate in two directions, so that it may overcome the defect that the linear vibration motor in prior arts customarily vibrates in a single direction.

The present disclosure provides a moving-magnet-type linear vibration motor that comprises: a housing, having an accommodation space; two elastic members, oppositely connected on side walls of the housing; a mass block, hung inside the accommodation space of the housing through circumferential wall respectively connected with the two elastic members; two magnets, respectively fixedly connected with two sides of the mass block, and forming an acute angle or an obtuse angle with respect to a connection line between the centers of the two elastic members; two coils, fixed on the housing and respectively spaced apart from a corresponding one of the magnets, and forming an acute angle or an obtuse angle with respect to the connection line between the centers of the two elastic members.

The two elastic members have equal size and a relative position that enables the mass block to conduct linear reciprocating movement between the two elastic members.

The magnets are parallel to the coils.

The angle formed by each of the magnets with respect to the connection line between the centers of the two elastic members is equal to the angle formed by each of the coils with respect to the connection line between the centers of the two elastic members.

Lorentz forces acted on the two coils have the same direction.

One of the magnets has an N pole at a top end in a tilted extending direction and an S pole at a bottom end in a tilted extending direction; the other magnet has an S pole at a top end in a tilted extending direction and an N pole at a bottom end in a tilted extending direction; electrical currents in the two coils have the same direction.

The magnets are Helbeck-structured magnetic steel assembly with a strong surface facing the coils.

A system composed of the elastic members and the mass block has one first-order modal state that is defined by movement along the connection line between the centers of the two elastic members and another first-order modal state that is defined by movement perpendicular to the connection line between the centers of the two elastic members; the mass block and the magnets vibrate in a direction corresponding to one of the two first-order modal states which has a frequency closer to a driving frequency.

Each of the elastic members comprises: a leaf spring structure, comprising at least three elastic sheets, with each two adjacent elastic sheets being connected to form an angle; a plurality of stopper blocks, provided on the elastic sheets, wherein, the elastic member contacts with the mass block and the housing respectively through the stopper blocks.

The housing comprises: a housing body, having a U-shape and a top opening; a top plate, covering on the top opening and cooperating with the housing body to form the accommodation space; two lateral plates, provided on two ends of the housing body, respectively, with a corresponding coil fixed on each of the lateral plates.

The moving-magnet-type linear vibration motor provided by the present disclosure further comprises two supporting blocks respectively connected with two sides of the mass block, with a mounting cavity provided on each of the supporting blocks for embedding a corresponding magnet.

The moving-magnet-type linear vibration motor provided by the present disclosure further comprises magnetic conducting plates, wherein the number of the magnetic conducting plates is the same as that of the supporting blocks, and each of the magnetic conducting plates is connected with one side of a corresponding supporting block facing the mass block.

The technical scheme of the present disclosure has the following advantages:

1. The moving-magnet-type linear vibration motor provided by the present disclosure comprises a housing, having an accommodation space; two elastic members, oppositely connected on side walls of the housing; a mass block, hung inside the accommodation space of the housing through circumferential wall respectively connected with the two elastic members; two magnets, respectively fixedly connected with two sides of the mass block, and forming an acute angle or an obtuse angle with respect to a connection line between the centers of the two elastic members; two coils, fixed on the housing and respectively spaced apart from a corresponding one of the magnets, and forming an acute angle or an obtuse angle with respect to the connection line between the centers of the two elastic members. By arranging each of the magnets to form an acute angle or an obtuse angle with respect to a connection line between the centers of the two elastic members and at the same time arranging each of the coils to form an acute angle or an obtuse angle with respect to a connection line between the centers of the two elastic members, the Lorentz force exerted on the coil can be decomposed into a first-direction force component along the connection line between the centers of the two elastic members and a second-direction force component perpendicular to the connection line between the centers of the two elastic members, i.e. the Lorentz force exerted on the coil can be decomposed into force components in two mutually perpendicular directions, and the magnet is correspondingly acted on by two respective acting forces of equal size and opposite direction relative to the two force components of the Lorentz force exerted on the coil, thereby the vibrator assembly comprising the magnet and the mass block can vibrate in two mutually perpendicular directions.

2. In the moving-magnet-type linear vibration motor provided by the present disclosure, the magnets are parallel to the coils, and this makes the magnetic field stronger, so that a larger driving force is provided for the vibrator assembly comprising the coil and the mass block to generate a stronger vibration feel.

3. In the moving-magnet-type linear vibration motor provided by the present disclosure, the magnets are Helbeck-structured magnetic steel assembly with a strong surface facing the coils, and this also makes the magnetic field stronger, so that a larger driving force is provided for the vibrator assembly.

4. In the moving-magnet-type linear vibration motor provided by the present disclosure, each of the elastic members comprises a leaf spring structure, comprising at least three elastic sheets, with each two adjacent elastic sheets being connected to form an angle; a plurality of stopper blocks, provided on the elastic sheets, wherein, the elastic member contacts with the mass block and the housing respectively through the stopper blocks. This kind of leaf spring structure, when forming a system together with the mass block, can have the required modal states in two directions, so that the vibrator assembly can be switched between two mutually perpendicular vibration directions by controlling the driving force frequency to be closer to a frequency of one of the modal states. Meanwhile, the arrangement of the stopper blocks can allow the leaf spring structure to have more stable contact with the mass block and the housing.

5. The moving-magnet-type linear vibration motor provided by the present disclosure further comprises two supporting blocks respectively connected with two sides of the mass block, with a mounting cavity provided on each of the supporting blocks for embedding a corresponding magnet. Because the magnet is embedded inside the mounting cavity, slipping out of the magnet from the mounting cavity can be effectively prevented, so that the magnet is mounted more firmly, thereby increasing the stability of vibration of the vibrator assembly. Meanwhile, due to the arrangement of the supporting block, when the moving-magnet-type linear vibration motor of the present disclosure falls, its collision with the housing takes precedence, so that the magnet and other structural components are protected.

6. The moving-magnet-type linear vibration motor provided by the present disclosure further comprises magnetic conducting plates, wherein, the number of the magnetic conducting plates is the same as that of the supporting blocks, and each of the magnetic conducting plates is connected with one side of a corresponding supporting block facing the mass block. The magnetic conducting plate can straighten the magnetic induction lines of the magnet, so that more magnetic induction lines go perpendicularly in and out of the coil, thereby providing a larger driving force for the vibrator assembly.

BRIEF DESCRIPTION OF THE DRAWINGS

In order to more clearly describe the technical scheme in the specific embodiments of the present disclosure or in the prior art, hereinafter, the accompanying drawings to be used in the description of the specific embodiments or the prior art will be briefly introduced. Apparently, the accompanying drawings described below are only directed to some embodiments of the present disclosure, and for those skilled in the art, without expenditure of creative labor, other drawings can be derived on the basis of these accompanying drawings.

Reference signs: 10—accommodation space, 11—housing body, 111—top opening, 12—top plate, 13—lateral plate, 2—elastic member, 21—elastic sheet, 22—stopper block, 3—mass block, 4—magnet, 5—coil, 6—supporting block, 61—mounting cavity, 7—magnetic conducting plate.

DETAILED DESCRIPTION

A clear and complete description of the technical scheme of the present disclosure is given below, in conjunction with the accompanying drawings. Apparently, the embodiments described below are a part, but not all, of the embodiments of the present disclosure. All the other embodiments, obtained by those skilled in the art on the basis of the embodiments described in the present disclosure without expenditure of creative labor, fall into the protection scope of the present disclosure.

Besides, the technical features involved in the various embodiments of the present disclosure described below can be combined with one another as long as they do not conflict with one another.

Figure 1:
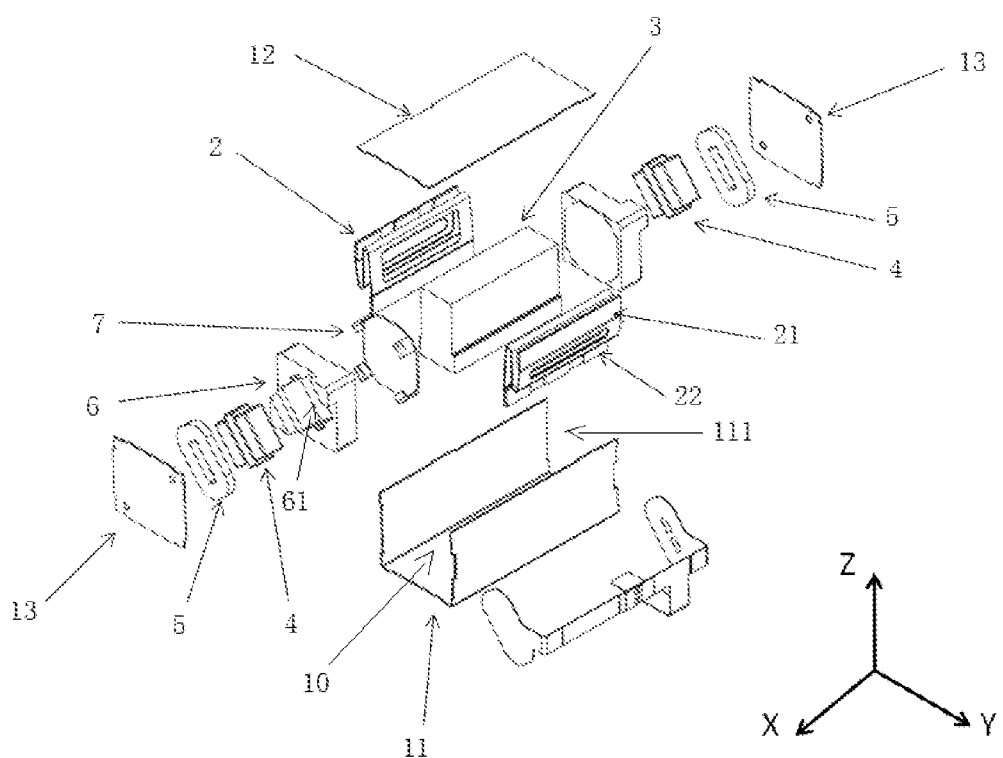
FIG. 1 is a stereoscopic exploded schematic view of a moving-magnet-type linear vibration motor provided in a first embodiment of the present disclosure.
Figure 2:
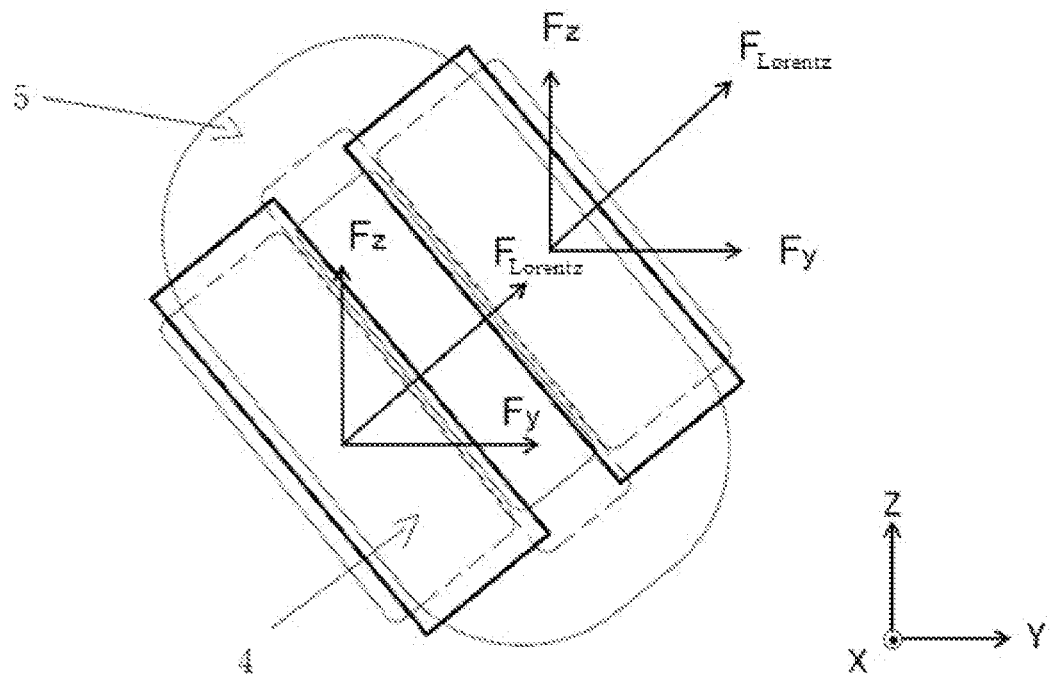
FIG. 2 is a force analysis schematic view of the coil of the moving-magnet-type linear vibration motor shown in FIG. 1.
Figure 3:
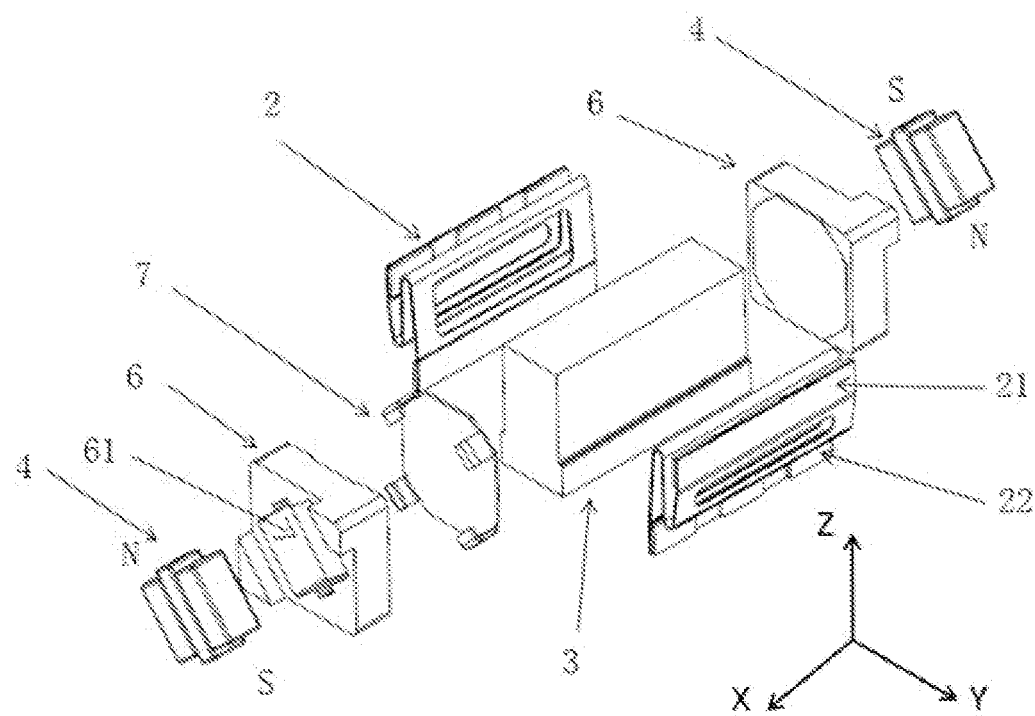
FIG. 3 is a stereoscopic exploded schematic view of the vibrator assembly of the moving-magnet-type linear vibration motor shown in FIG. 1.
Figure 3:
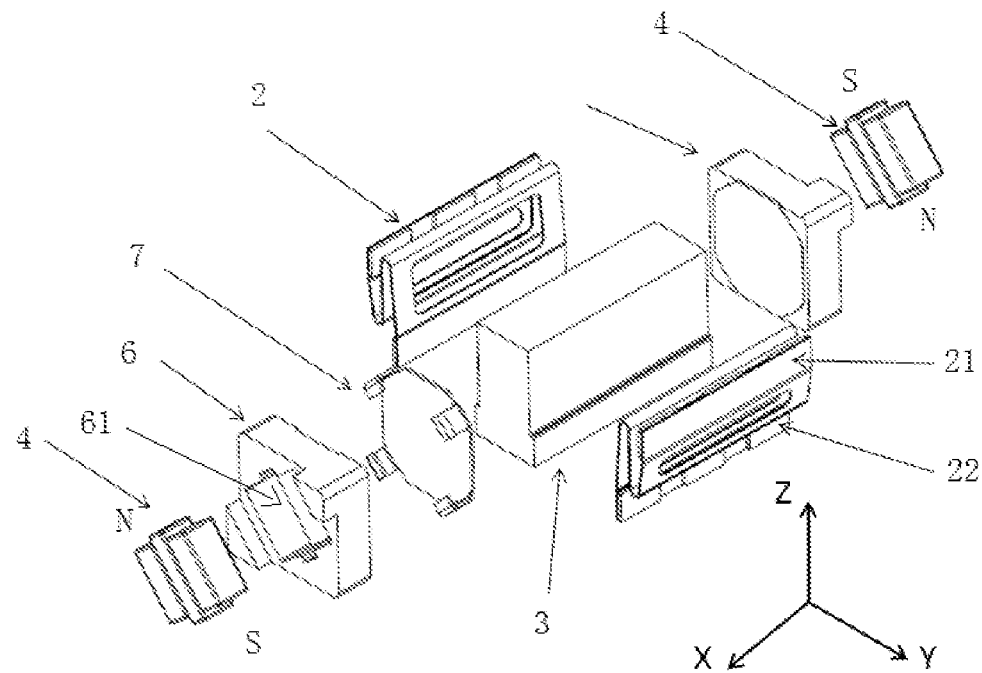

As shown in FIG. 1 to FIG. 3, the present embodiment provides a moving-magnet-type linear vibration motor that comprises a housing, elastic members 2, a mass block 3, coils 4 and magnets 5.

The housing has an accommodation space 10.

There are two elastic members 2 oppositely connected on side walls of the housing.

The mass block 3 is hung inside the accommodation space 10 of the housing through circumferential wall respectively connected with the two elastic members 2.

There are two magnets 4 respectively fixedly connected with two sides of the mass block 3, and each of the magnets 4 forms an acute angle or an obtuse angle with respect to a connection line between the centers of the two elastic members 2.

There are two coils 5 fixed on the housing and respectively spaced apart from a corresponding one of the coils 4, and each of the coils 5 forms an acute angle or an obtuse angle with respect to the connection line between the centers of the two elastic members 2.

In FIG. 1 and FIG. 2, the X direction is in the longitudinal extending direction of the mass block 3, the Y direction is along the connection line between the centers of the two elastic members 2, and the Z direction is a direction that is simultaneously perpendicular to both the X direction and the Y direction. By arranging each of the magnets 4 to form an acute angle or an obtuse angle with respect to a connection line between the centers of the two elastic members 2 and meanwhile, arranging each of the coils 5 to form an acute angle or an obtuse angle with respect to a connection line between the centers of the two elastic members 2, the Lorentz force exerted on the coil 5 can be decomposed into a first-direction force component along the connection line between the centers of the two elastic members 2 (in the Y direction of FIG. 1) and a second-direction force component perpendicular to the connection line between the centers of the two elastic members 2 (in the Z direction of FIG. 1), i.e. the Lorentz force exerted on the coil 5 can be decomposed into force components in two mutually perpendicular directions, and correspondingly the magnet 4 is acted on by two respective acting forces of equal size and opposite direction relative to the two force components of the Lorentz force exerted on the coil 5, thereby the vibrator assembly comprising the magnet 4 and the mass block 3 can vibrate in two mutually perpendicular directions.

The two elastic members 2 have equal size and a relative position that enables the mass block 3 to conduct linear reciprocating movement between the two elastic members 2. In this embodiment, the two elastic members 2 have such a relative position that the connection line between the centers of the two elastic members 2 is parallel to the cross-sectional plane of the mass block 3, and in particular, the centers of the two elastic members 2 are collinear with the center of the mass block 3.

The magnets 4 are parallel to the coils 5, and the angle formed by a longitudinal direction of each of the magnets 4 with respect to the connection line between the centers of the two elastic members 2 is equal to the angle formed by each of the coils 5 with respect to the connection line between the centers of the two elastic members 2. This makes the magnetic field stronger, so that a larger driving force is provided for the vibrator assembly comprising the magnet 4 and the mass block 3, in order to cause a stronger vibration feel.

In order to keep the motion of the vibrator assembly in balance, the Lorentz forces acted on the two coils 5 are arranged to have the same direction.

There are multiple ways to realize that the Lorentz forces acted on the two coils 5 are have the same direction. In this embodiment, one of the magnets 4 has an N pole at a top end in a tilted extending direction (i.e. a tilting direction of the magnet 4 relative to the connection line between the centers of the two elastic members 2) and an S pole at a bottom end in the tilted extending direction; the other magnet 4 has an S pole at a top end in a tilted extending direction and an N pole at a bottom end in the tilted extending direction; electrical currents in the two coils 5 have the same direction.

In order to make the magnetic field stronger so that a larger driving force is provided for the vibrator assembly, the magnets 4 in this embodiment are Helbeck-structured magnetic steel assembly with a strong surface facing the coils 5. In this embodiment, the magnetic steel assembly is composed of three magnetic steel sheets. As an alternative embodiment, the magnetic steel assembly may also be composed of five magnetic steel sheets.

A system composed of the elastic members 2 and the mass block 3 has one first-order modal state that is defined by movement along the connection line between the centers of the two elastic members 2 and another first-order modal state that is defined by movement perpendicular to the connection line between the centers of the two elastic members 2; the mass block 3 and the magnets 4 vibrate in a direction corresponding to one of the two first-order modal states which has a frequency closer to a driving frequency. Wherein, the driving frequency refers to an output frequency of a drive unit that energizes the coils 5. When the driving frequency is closer to the frequency of the first modal state relative to the frequency of the second modal state, the first modal state is activated so that the vibrator assembly mainly manifests movement along the connection line between the centers of the two elastic members 2; when the driving frequency is closer to the frequency of the second modal state relative to the frequency of the first modal state, the second modal state is activated so that the vibrator assembly mainly manifests movement perpendicular to the connection line between the centers of the two elastic members 2. In this way, by controlling the driving frequency to be closer to one of the modal states, the vibrator assembly can be switched between two mutually perpendicular vibration directions.

The elastic members can have various kinds of specific structures. In this embodiment, each of the elastic members comprises a leaf spring structure and stopper blocks 22.

The leaf spring structure comprises three elastic sheets 21, with each two adjacent elastic sheets 21 being connected to form an angle, that is to say, the leaf spring has an N-shape. This kind of leaf spring structure can have the two modal states, so that, by controlling the driving frequency to be closer to a frequency of one of the modal states, the vibrator assembly can be switched between two mutually perpendicular vibration directions. In this embodiment, the three elastic sheets are connected in an integral manner. As an alternative embodiment, the leaf spring structure may comprise four or more elastic sheets 21. When the leaf spring structure comprises four elastic sheets 21, the leaf spring structure has a W-shaped structure.

There are a plurality of stopper blocks 22 provided on the elastic sheets 21, wherein, at least one stopper block 22 is disposed on a stopper block 22 adjacent to the mass block 3, for contacting with the mass block 3; meanwhile, at least one stopper block 22 is disposed on a stopper block 22 adjacent to the housing, for contacting with the housing. Thereby the leaf spring structure can have more stable contact with the mass block 3 and the housing.

Figure 4:
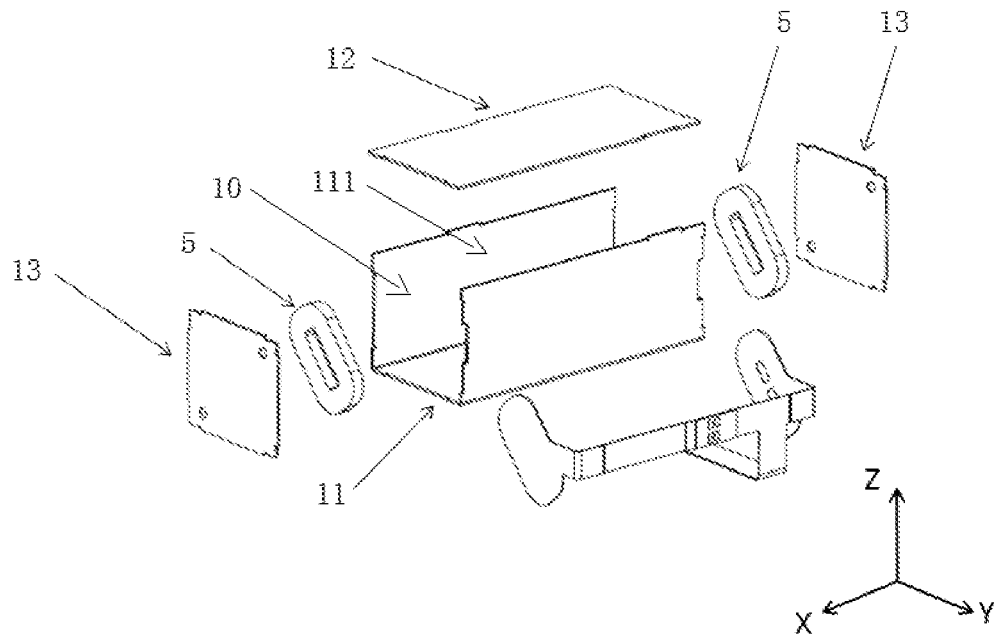
FIG. 4 is a structural schematic view of the part including the housing and the coils of the moving-magnet-type linear vibration motor shown in FIG. 1.

Also with reference to FIG. 4, the housing comprises a housing body 11, a top plate 12 and lateral plates 13.

The housing body has a U-shape and a top opening 111.

The top plate 12 covers on the top opening 111 and cooperates with the housing body 11 to form the accommodation space 10.

There are two lateral plates 13 provided on two ends of the housing body 11, respectively, with a corresponding coil 5 fixed on each of the lateral plates 13.

The moving-magnet-type linear vibration motor of this embodiment further comprises two supporting blocks 6 respectively connected with two sides of the mass block 3, and magnetic conducting plates 7, wherein, the number of the magnetic conducting plates 7 is the same as that of the supporting blocks 6.

Each of the supporting blocks 6 is provided with a mounting cavity 61 for embedding a corresponding magnet 4. Because the magnet 4 is embedded inside the mounting cavity 61, slipping out of the magnet 4 from the mounting cavity 61 can be effectively prevented, so that the magnet 4 is mounted more firmly, thereby increasing the stability of vibration of the vibrator assembly. Meanwhile, due to the arrangement of the supporting block 6, when the moving-magnet-type linear vibration motor of this embodiment falls, its collision with the housing takes precedence, so that the magnet 4 and other structural components are protected.

Each of the magnetic conducting plates 7 is connected with one side of a corresponding supporting block 6 facing the mass block 3. The magnetic conducting plate 7 can straighten the magnetic induction lines of the magnet 4, so that more magnetic induction lines go perpendicularly in and out of the coil 5, thereby providing a larger driving force for the vibrator assembly.

Apparently, the aforementioned embodiments are merely examples illustrated for clearly describing the present disclosure, rather than limiting the implementation ways thereof. For those skilled in the art, various changes and modifications in other different forms can be made on the basis of the aforementioned description. It is unnecessary and impossible to exhaustively list all the implementation ways herein. However, any obvious changes or modifications derived from the aforementioned description are intended to be embraced within the protection scope of the present disclosure.

What is claimed is:

1. A moving-magnet-type linear vibration motor, comprising:
    a housing, having an accommodation space;
    two elastic members, oppositely connected on side walls of the housing;
    a mass block, hung inside the accommodation space of the housing through circumferential wall respectively connected with the two elastic members;
    two magnets, respectively fixedly connected with two sides of the mass block, and forming an acute angle or an obtuse angle with respect to a connection line between the centers of the two elastic members;
    two coils fixed on the housing and respectively spaced apart from a corresponding one of the magnets, and forming an acute angle or an obtuse angle with respect to the connection line between the centers of the two elastic members;
    the X direction is in the longitudinal extending direction of the mass block, the Y direction is along the connection line between the centers of the two elastic members, and the Z direction is a direction that is simultaneously perpendicular to both the X direction and the Y direction; the Lorentz force exerted on each of the two coils is decomposed into components in the Y direction and in the Z direction; and each of the two magnets is correspondingly acted on by two respective acting forces of equal size and opposite direction relative to the two force components of the Lorentz force exerted on each of the two coils;
    wherein the magnets are Helbeck-structured magnetic steel assembly with a strong surface facing the coils.

2. The moving-magnet-type linear vibration motor of claim 1, wherein, the two elastic members have equal size and a relative position that enables the mass block to conduct linear reciprocating movement between the two elastic members.

3. The moving-magnet-type linear vibration motor of claim 2, wherein, the magnets are parallel to the coils.

4. The moving-magnet-type linear vibration motor of claim 2, wherein, the angle formed by each of the magnets with respect to the connection line between the centers of the two elastic members is equal to the angle formed by each of the coils with respect to the connection line between the centers of the two elastic members.

5. The moving-magnet-type linear vibration motor of claim 2, wherein, Lorentz forces acted on the two coils have the same direction.

6. The moving-magnet-type linear vibration motor of claim 2, wherein, a system composed of the elastic members and the mass block has one first-order modal state that is defined by movement along the connection line between the centers of the two elastic members and another first-order modal state that is defined by movement perpendicular to the connection line between the centers of the two elastic members; the mass block and the magnets vibrate in a direction corresponding to one of the two first-order modal states which has a frequency closer to a driving frequency.

7. The moving-magnet-type linear vibration motor of claim 2, wherein, each of the elastic members comprises:
    a leaf spring structure, comprising at least three elastic sheets, with each two adjacent elastic sheets being connected to form an angle;
    a plurality of stopper blocks, provided on the elastic sheets, wherein the elastic member contacts with the mass block and the housing respectively through the stopper blocks.

8. The moving-magnet-type linear vibration motor of claim 2, wherein, the housing comprises:
    a housing body, having a U-shape and a top opening;
    a top plate, covering on the top opening and cooperating with the housing body to form the accommodation space;
    two lateral plates, provided on two ends of the housing body, respectively, with a corresponding coil fixed on each of the lateral plates.

9. The moving-magnet-type linear vibration motor of claim 2, wherein, further comprising two supporting blocks respectively connected to two sides of the mass block, with a mounting cavity provided on each of the supporting blocks for embedding a corresponding magnet.

10. The moving-magnet-type linear vibration motor of claim 1, wherein, the magnets are parallel to the coils.

11. The moving-magnet-type linear vibration motor of claim 1, wherein, the angle formed by each of the magnets with respect to the connection line between the centers of the two elastic members is equal to the angle formed by each of the coils with respect to the connection line between the centers of the two elastic members.

12. The moving-magnet-type linear vibration motor of claim 1, wherein, Lorentz forces acted on the two coils have the same direction.

13. The moving-magnet-type linear vibration motor of claim 12, wherein, one of the magnets has an N pole at a top end in a tilted extending direction and an S pole at a bottom end in a tilted extending direction; the other one of the magnets has an S pole at a top end in a tilted extending direction and an N pole at a bottom end in a tilted extending direction;
    electrical currents in the two coils have the same direction.

14. The moving-magnet-type linear vibration motor of claim 1, wherein, a system composed of the elastic members and the mass block has one first-order modal state that is defined by movement along the connection line between the centers of the two elastic members and another first-order modal state that is defined by movement perpendicular to the connection line between the centers of the two elastic members; the mass block and the magnets vibrate in a direction corresponding to one of the two first-order modal states which has a frequency closer to a driving frequency.

15. The moving-magnet-type linear vibration motor of claim 1, wherein, each of the elastic members comprises:
   a leaf spring structure, comprising at least three elastic sheets, with each two adjacent elastic sheets being connected to form an angle;
   a plurality of stopper blocks, provided on the elastic sheets, wherein the elastic member contacts with the mass block and the housing respectively through the stopper blocks.

16. The moving-magnet-type linear vibration motor of claim 1, wherein, the housing comprises:
   a housing body, having a U-shape and a top opening;
   a top plate, covering on the top opening and cooperating with the housing body to form the accommodation space;
   two lateral plates, provided on two ends of the housing body, respectively, with a corresponding coil fixed on each of the lateral plates.

17. The moving-magnet-type linear vibration motor of claim 1, wherein, further comprising two supporting blocks respectively connected to two sides of the mass block, with a mounting cavity provided on each of the supporting blocks for embedding a corresponding magnet.

18. The moving-magnet-type linear vibration motor of claim 17, wherein, further comprising magnetic conducting plates, wherein, the number of magnetic conducting plates is the same as that of the supporting blocks, and each of the magnetic conducting plates is connected with one side of a corresponding supporting block facing the mass block.

* * * * *